(12) United States Patent
Yamajiri et al.

(10) Patent No.: US 6,582,308 B1
(45) Date of Patent: Jun. 24, 2003

(54) IMAGE PROCESSING DEVICE AND CHARACTER ASPECT DESIGN DEVICE

(75) Inventors: Tatsuo Yamajiri, Tokyo (JP); Satoshi Sakai, Tokyo (JP); Manabu Kusunoki, Tokyo (JP); Yukio Futatsugi, Tokyo (JP); Kenichi Ikejiri, Tokyo (JP)

(73) Assignee: Kabushiki Kaisha Sega Enterprises, Tokyo (JP)

( * ) Notice: Subject to any disclaimer, the term of this patent is extended or adjusted under 35 U.S.C. 154(b) by 0 days.

(21) Appl. No.: 09/046,262

(22) Filed: Mar. 23, 1998

(30) Foreign Application Priority Data

Mar. 23, 1997 (JP) ............................................. 9-087494

(51) Int. Cl.⁷ ........................... A63F 13/00; A63F 9/24; G06F 17/00; G06F 19/00
(52) U.S. Cl. ............................. 463/31; 463/1; 463/32; 463/33; 463/34; 463/43; 434/27
(58) Field of Search ........................... 463/31, 1, 3, 32, 463/33, 34, 43, 46, 47, 49, 50, 57, 52, 53, 54, 56; 273/317, 108.2; 345/11, 29, 27, 33, 76, 77, 90, 127, 131; 395/140, 141, 142, 143; 434/27, 44, 38, 43, 68, 308, 365

(56) References Cited

U.S. PATENT DOCUMENTS

| | | | | |
|---|---|---|---|---|
| 5,390,937 A | * | 2/1995 | Sakaguchi et al. | 273/434 |
| 5,601,487 A | * | 2/1997 | Oshima et al. | 463/4 X |
| 5,649,862 A | * | 7/1997 | Sakaguchi et al. | 463/44 X |
| 5,680,533 A | * | 10/1997 | Yamato et al. | 395/173 X |
| 5,689,618 A | * | 11/1997 | Gasper et al. | 395/2.95 X |
| 5,712,658 A | * | 1/1998 | Arita et al. | 345/158 X |
| 5,771,167 A | * | 6/1998 | Gomi et al. | 364/140 X |
| 5,779,548 A | * | 7/1998 | Asai et al. | 463/31 X |
| 5,827,120 A | * | 10/1998 | Kikuchi et al. | 463/40 X |
| 5,830,065 A | * | 11/1998 | Sitrick | 463/31 X |
| 5,880,709 A | * | 3/1999 | Itai et al. | 345/113 X |
| 5,938,530 A | * | 8/1999 | Watanabe | 463/31 X |
| 5,971,852 A | * | 10/1999 | Itai et al. | 463/31 |
| 5,977,968 A | * | 11/1999 | Le Blanc | 345/339 X |
| 6,001,017 A | * | 12/1999 | Okano et al. | 463/43 X |

* cited by examiner

Primary Examiner—Valencia Martin-Wallace
Assistant Examiner—Binh-An D. Nguyen
(74) Attorney, Agent, or Firm—Keating & Bennett, LLP

(57) ABSTRACT

The present invention relates to an image processing device which allows character aspects to be changed continuously. The present device is capable of displaying a cursor point and a character in standard aspect on a screen, and by transforming and displaying character aspect in accordance with parameters for defining characters, moving the cursor point in line with movement commands from peripheral devices, and continuously changing the parameters which define the character in line with the movement of the cursor point, serves continuously to transform and display character aspect.

29 Claims, 11 Drawing Sheets

IMAGE PROCESSING DEVICE AND CHARACTER ASPECT DESIGN DEVICE

BACKGROUND OF THE INVENTION

1. Field of the Invention

The present Invention relates to an image processing device. More specifically, it relates to a television game machine for domestic and commercial use. Even more specifically, it relates to an image processing device and character aspect design device whereby it is possible to design or modify the aspect of characters defined within an imaginary three-dimensional space.

2. Description of the Related Art

Conventional television game machines of this type are configured so that it is possible to play action games, shooting games, role-playing games, and other similar games. An example is the 'Panzer Dragoon' game previously marketed by the applicant, which simulates a shooting game where the young hero attacks a large number of enemies.

In this type of game, the player operates a character, attacking characters on the enemy side. Points are awarded according to the success or failure of the attack, and the player proceeds for instance to the next stage if his score is high, while the game finishes if it is low. In order to make the game more interesting, it has become common to make it possible to vary the properties character by character. To be more precise, one character may be strong on the offensive but weak on the defensive, another may be strong on the defensive and weak on the offensive, while yet another character may be skilled in some specific feat.

In game machines of this sort the aspects and properties of the characters are programmed in advance. For instance, the initial screen at the start of game may display the characters in a row so that the player can choose the character he wants from the character selection screen. Each of these characters is displayed on the monitor in a different aspect (colour, shape, pattern etc.). and each is allocated different properties.

If the player wishes to have a particular type of character, he may either choose a specific one from among a plurality of characters, as already mentioned, or alternatively he can alter the aspect and properties of a character every time he plays the game.

However, in either case conventional game machines have permitted selection of aspect and properties only by stages, and it has not been possible to set the aspect and properties to the state which the player wishes, or to set them to a status with the desired numerical values.

SUMMARY OF THE INVENTION

It is an object of the present invention to provide an image processing device and character aspect design device, or a method of implementing these, whereby it is possible continuously to change the aspect or properties of a character, or both.

It is a further object of the present invention to provide a device and method whereby the processing which is required to this end can be implemented in a simple manner while viewing the screen. With a view to attaining this object, the present invention is an image processing device wherein it is possible to set parameters for defining characters, comprising: (1) means of display control whereby a character in standard aspect and a cursor point are displayed on the screen, the aspect of the character is transformed and displayed in accordance with parameters for defining it, and the cursor point is moved in accordance with movement commands from peripheral devices, and (2) means of processing whereby the parameters which define the character are changed continuously in line with the movement of the cursor point.

The character aspect design device to which the present invention pertains comprises (1) means of display control whereby a character in standard aspect and a cursor point are displayed on the screen, the aspect of the,character is transformed and displayed in accordance with parameters for defining it, and the cursor point is moved in accordance with movement commands from peripheral devices, (2) means of processing whereby the parameters which define the character are changed continuously in line with the movement of the cursor point, and (3) means whereby when the aspect transformation of the character displayed is the one desired by the designer, the parameters which have been changed by the means of processing are adopted as the defining parameters of the character to be used in image processing.

Moreover, in one aspect of the character aspect design device to which the present invention pertains, the means of processing has a plurality of character models, and is supplied with means whereby it continuously changes the parameters which define each character model in accordance with the positional data which the cursor point occupies within the coordinates.

In the preferred embodiment, these devices have means of display control whereby the various properties of the character after transformation are rendered into an image and displayed.

Another aspect of the present invention is a method of processing character aspect designs whereby character aspects are displayed on the screen and continuously changed until the final aspect of the character has been designed, comprising a first processing step whereby the character is displayed on the screen, a second processing step whereby a prescribed position on the coordinates corresponding to the character aspect is designated, and a third processing step whereby the continuous changes in the coordinate position are reflected in continuous changes in the character properties.

Yet another aspect of the present invention is a design processing device for character properties whereby a character is displayed on the screen while its properties are changed, comprising a first means of processing whereby the character is displayed on the screen, a second means of processing whereby a prescribed position on the coordinates corresponding to the character aspect is designated, and a third means of processing whereby the continuous changes in the coordinate position are reflected in continuous changes in the character properties.

The present invention is also a design device for characters in image processing, wherein the position data of the cursor displayed on the screen is reflected continuously in changes in the aspect and/or properties of the character.

The present invention is also a game machine having means of game proceeding processing whereby a game is proceeded in accordance with a predetermined game program, comprising: means of character display whereby a character controlled pursuant to operational signals from a player is displayed; means of property definition whereby properties of the character are defined; and means of character aspect alteration whereby an aspect of the character is altered on the basis of property data defined by the means of property definition.

Moreover, the present invention is a game machine having means of game proceeding processing whereby a game is proceeded in accordance with a predetermined game program, comprising: means of character display whereby a character controlled pursuant to operational signals from a player is displayed; means of character aspect alteration whereby an aspect of the character is altered continuously in line with operational signals from a player; and means of property definition whereby properties of the character are defined corresponding to the displayed aspect of the character.

Furthermore, the present invention is a game machine having means of game proceeding processing whereby a game is proceeded in accordance with a predetermined game program, comprising: means of character display whereby a character controlled pursuant to operational signals from a player is displayed; a character having a plurality of standard displayed aspects corresponding to a plurality of preset properties; and means of property definition whereby the plurality of character properties are respectively defined on the basis of the operational signals from the player, wherein the plurality of standard displayed aspects are mixed and displayed on the basis of the ratio of the plurality of properties defined by the means of property definition.

In the present invention, an "aspect" means a certain characteristic of displaying a character image on the screen. Aspects include shapes, patterns, colours, virtual materials of the character, feelings of such virtual materials, etc.

Furthermore, a character image made semitransparent or displayed in meshes, intentional clipping, rotation, enlargement or reduction of a character image, or a change of texture mapped on the character etc. are to be regarded as changes added to the displayed aspect of the character. The term "aspect" may be substituted with a term "manner."

DESCRIPTION OF THE PREFERRED EMBODIMENTS

There follow several embodiments whereby the present invention will be described in greater detail. The descriptions which follow take the example of its application in three-dimensional space to role-playing and shooting games played between the enemy character, which is controlled by the game machine or a rival player, and the character on the player's side.

First Embodiment

Figure 1:
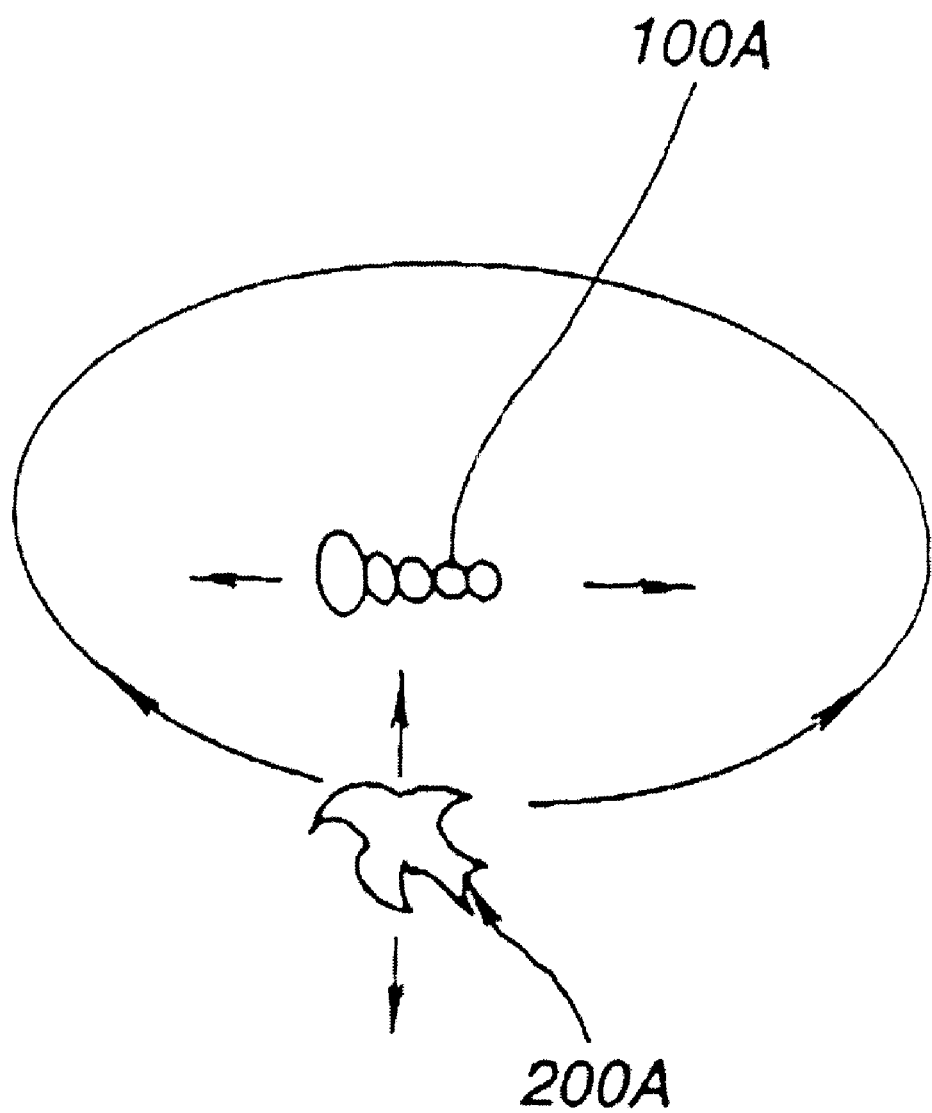
FIG. 1 is a diagram representing the principle behind the shooting game to which the first embodiment pertains.

The first embodiment seeks to make it possible to design character aspect freely by altering at will the player character aspect used when playing the game as illustrated in FIG. 1, and to alter the properties (status) of the character at will in accordance with alterations to its aspect.

Before details of the first embodiment are described, the game to which the first embodiment is applied will be described in brief with reference to FIG. 1. In FIG. 1, code 100A is the enemy character, while code 200A is the player character. The enemy character 100A represents a huge flying insect, and the player character 200A a flying dragon. FIG. 1 illustrates the positional relationship between the player character and enemy character in the form of an oblique view. It does not matter what the aspect of the character corresponding to the player character or enemy character is.

The player character 200A can both fly around the enemy character 100A in the direction of the arrows, and also move vertically in the direction of the arrows. The enemy character 100A moves, for instance, through the imaginary space in the direction of the arrows.

The player character 200A can fly around the enemy character 100A while moving up and down in line with the movement of the enemy character 100A.

The enemy character 100A can carry out various types of attack against the player character, for example, at random, while the player can avoid the attacks of the enemy character 100A by operating the player character 200A freely, and can also operate it in such a manner as to attack the enemy character 100A. If the player character 200A inflicts mortal damage on the enemy character 100A within the prescribed time, he is deemed to have won the battle. The game ends if the player character 200A is mortally wounded. From the point of view of making the game more interesting, it is effective if the offensive power, defensive power and other properties of the characters (particularly the player character) can be altered, or if the aspect of the character can be changed in line with these properties.

The aspect of the player character 200A while the game unfolds is transformed continuously by using operational commands to move the cursors as coordinate display point on the type selection screen prior to commencement of the game. The status values also change according to changes in the aspect, and these changes in status value can be displayed in real time through patterns and numerical values.

FIG. 2 is an explanatory diagram which illustrates how the aspect of the player character is changed continuously on the type selection screen.

Figure 2A:
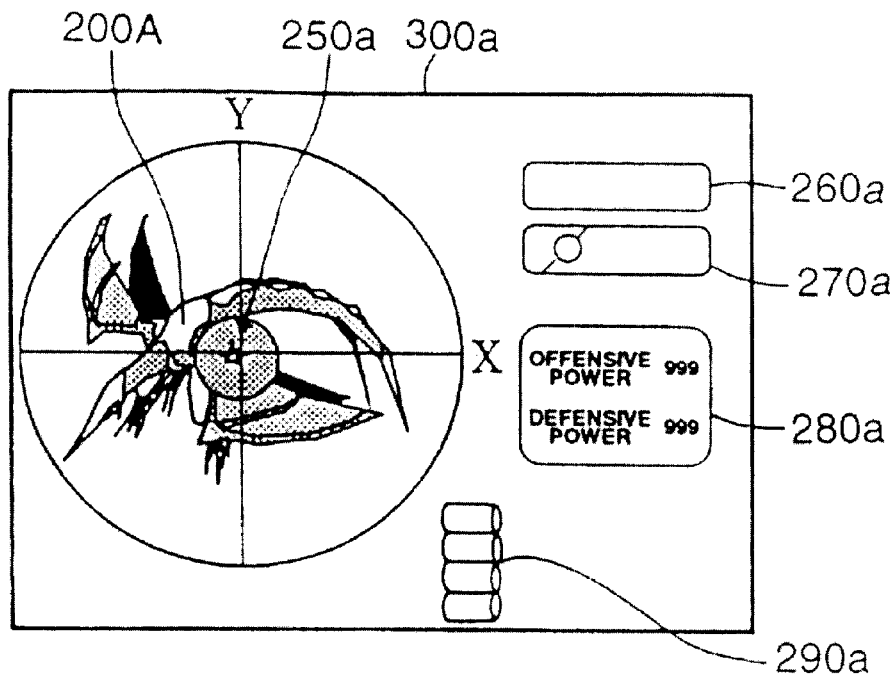
FIG. 2 is an outline diagram which serves to explain the first embodiment.

First of all, the pad or other device for operating the game machine is operated in order to give the machine the operational command to select the type selection screen. The initial screen 300a as illustrated in FIG. 2(a) is displayed. On the initial screen 300a are displayed the axes X and Y, which intersect at right-angles as shown in FIG. 2(a). The player character 200A is displayed revolving slowly with the centre of its torso on the point of intersection of the axes X and Y. On the initial screen 300a, the cursor 250a is also positioned on the point of intersection of the axes X and Y.

Figure 2B:
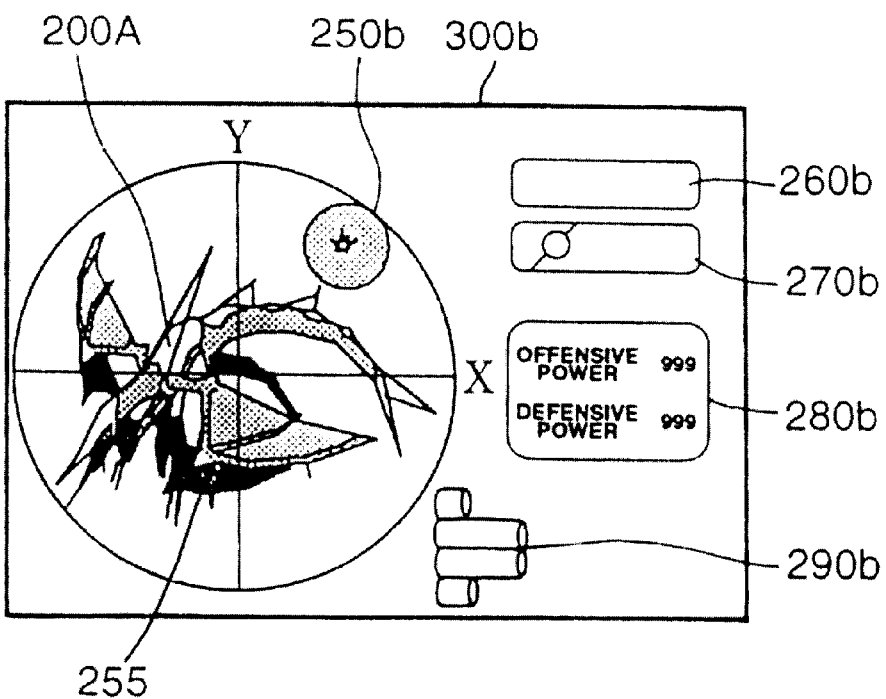

Since the cursor 250a functions as an imaginary light source, the shadow 255 (FIG. 2(b)) of the character 200A is displayed in point symmetry with the cursor 250 (the suffixed code 'a' signifies the initial screen, and will be removed where the referent is common to other screens) in relation to the point of intersection of the axes X and Y according to the position of the cursor 250.

In other sections of the initial screen 300a are displayed the character name 260a of the character 200A, a lock-on number 270a, status values 280a, and status graph displays 290a.

If the pad or other device for operating the game machine is operated in order to give the machine the operational command to move the cursor 250 to a prescribed position in the area where the intersecting axes X and Y are X>0, Y>0, the initial screen 300a changes to the screen 300b as illustrated in FIG. 2(b).

While the cursor 250 is moving from the initial screen 300a to the screen 300b, the aspect of the character 200A is displayed changing continuously in accordance with the moving coordinate values of the cursor 250. Meanwhile, the position of the shadow 255 of the character 200A is displayed continuously in point symmetry with the cursor 250. The shape of the wings and face, for example, of the dragon-like player character change, as does its colouration. Moreover, in line with the movement of the cursor 250 the current status value of the character 200A is displayed in real time in the areas of the lock-on number 270a, status values 280a, and status graph displays 290a.

When the character 200A has assumed the aspect which the player desires, the pad or other device for operating the game machine is operated in order to input the operational command OK into the game machine. This serves to set the aspect of the character 200A in the position of the cursor 250 as the final aspect, and the character 200A is then ready for use in the game.

The status corresponds to the properties of the character, and is defined by prescribed parameters in the same way as the character aspect.

Basic Configuration of the Game Machine

Figure 3:
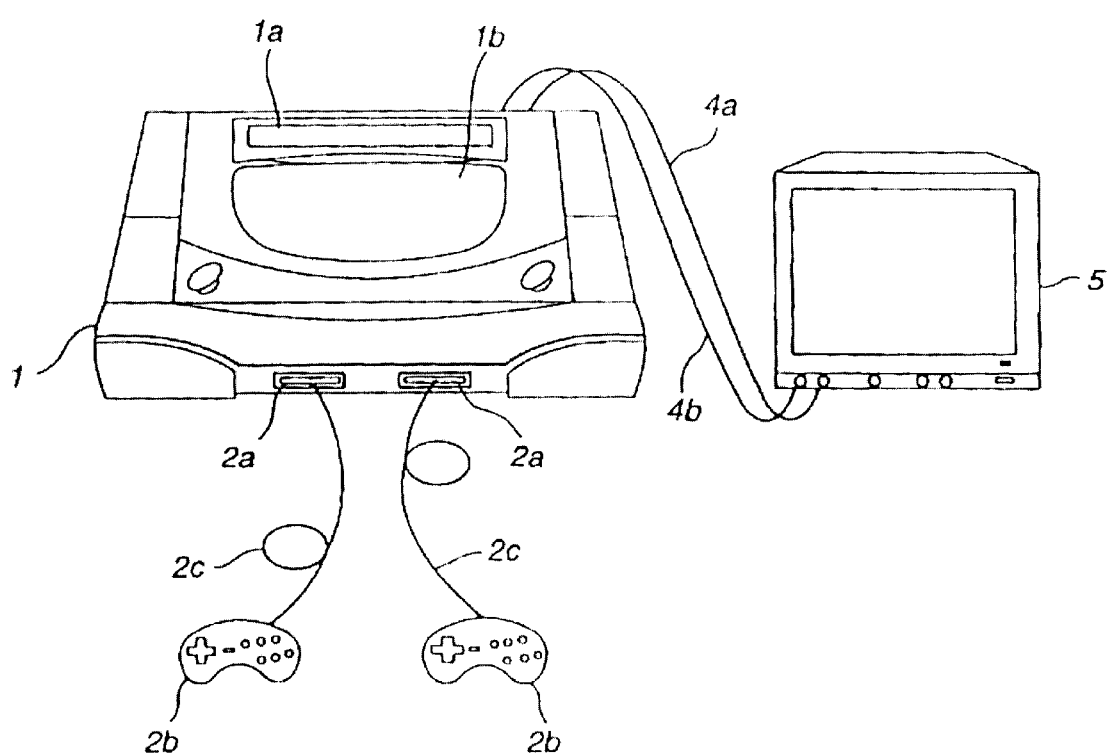
FIG. 3 is an oblique view depicting the external appearance of the game machine.

FIG. 3 is an oblique view depicting the external appearance of the game machine. In the drawing, code 1 is the body of a television game machine. On the front surface of the body of the television game machine 1 are located two connectors 2a, 2a, to which are connected pads or similar peripherals 2b, 2b for operating the game machine via cables 2c, 2c.

On top of the body of the television game machine 1 is located a CD-ROM drive 1b for the purpose of reading CD-ROMs. On the rear surface of the body of the television game machine 1 are located video and audio output terminals (not shown in the drawing). The video output terminal is connected via a cable 4a to the video input terminal of a television receiver 5.

The audio output terminal is connected via a cable 4b to the audio input terminal of the television receiver 5. With a game machine of this sort, the user can play games by operating the peripherals 2b, 2b while viewing the screen which is reproduced on the television receiver 5.

Configuration of the Game Machine Hardware

Figure 4:
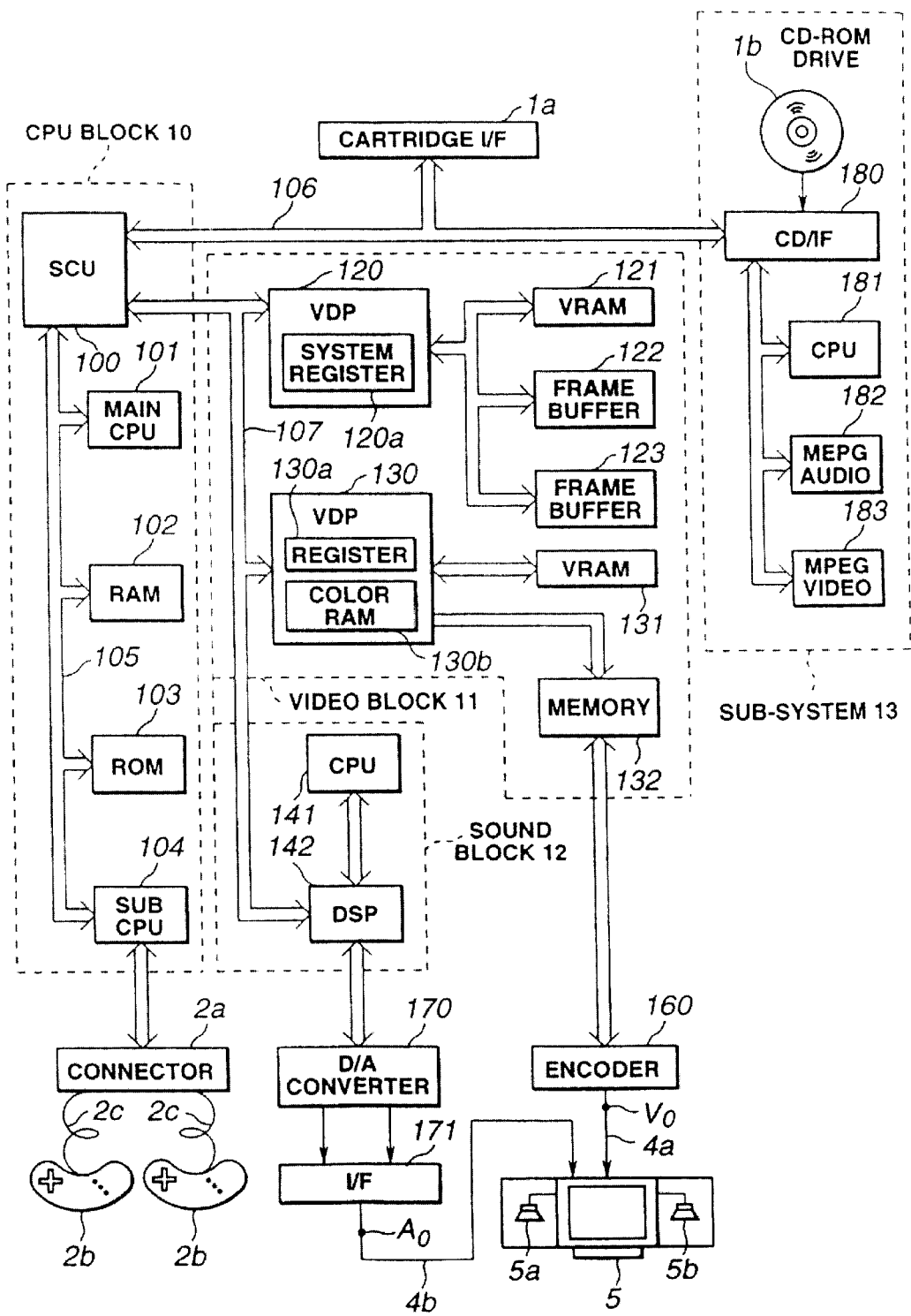
FIG. 4 is a diagram which illustrates the configuration of the hardware blocks of the game machine.

FIG. 4 is a block diagram which illustrates the essential configuration of the television game machine. The body of the game machine comprises a CPU block 10 which controls the whole device, a video block 11 which controls the game screen display, a sound block 12 which generates sound effects, and a sub-system 13 which reads the CD-ROM.

The CPU block 10 comprises a SCU (system control unit) 100, main CPU 101, RAM 102, ROM 103, cartridge I/F 1a, sub CPU 104, CPU bus 105 and other elements.

The main CPU 101 controls the whole device. This main CPU 101 has within it a computing facility similar to a DSP (digital signal processor), and is capable of implementing application software at high speed.

The RAM 102 is used as the work area of the main CPU 101. Into the ROM 103 is written the initial program for use in initialisation processing. By controlling buses 105, 106, 107, the SCU 100 implements the smooth inputting and outputting of data between the main CPU 101, VDPs 120, 130 and DSP 142.

The SCU 100 also has a DMA controller within it, and can transmit character data (polygon data) during a game to a VRAM 121 within the video block 11. This enables the application software of the game machine to be executed at high speed. The cartridge I/F 1a serves to input the application software, which is provided in the form of a ROM cartridge, into the prescribed bock within the body of the television game machine.

The sub CPU 104 is known as a SMPC (system manager and peripheral control), and has the function of collecting peripheral data from the peripherals 2b, 2b via the connectors 2a, 2a of FIG. 3 in response to requests from the main CPU 101.

The main CPU 101 receives peripheral data from the sub CPU 104 and implements image control such as rotating the (coordinates of the) character in three-dimensional space or making it transparent, and processes this for display on the screen. Pads, joysticks, keyboards and other peripherals may be connected at will to the connectors 2a, 2a. The sub CPU 104 has the facility to recognise automatically which type of peripherals have been connected to the connectors 2a, 2a, and to collect peripheral data in accordance with the method of communication applicable to that type. The video block 11 has a first VDP (video display processor) 120 which draws a polygon screen consisting of polygon data from the television game over the images of the characters and the background, and a second VDP 130 which in line with scroll background image plotting and priority executes screen synthesis of polygon image data and scroll image data along with clipping and other operations.

The first VDP 120 houses within it a system register 120a, and is connected to a VRAM (DRAM) 121 and two frame buffers 122, 123. Polygon plotting data representing the characters in the television game is fed via the main CPU 101 to the first VDP 120, and the plotting data written into the VRAM 121 is plotted, for example, in 16 or 8 bits/pixel form into the plotting frame buffer 122 (or 123). The plotted data from the frame buffer 122 (or 123) is fed during display aspect to the second VDP 130.

The buffers 122, 123 are used as frame buffers in this manner, constituting a double buffer configuration where plotting and display change frame by frame. What is more, plotting and display are controlled by the first VDP 120 in accordance with commands set in its system register 120a from the main CPU 101 via the SCU 100.

Meanwhile, the second VDP 130 houses a register 130a and a colour RAM 130b within it, and is connected to a VRAM 131. The second VDP 130 is not only connected via the bus 107 to the first VDP 120 and the SCU 100, but via a memory 132 and encoder 160 to the video output terminal Vo. To the video output terminal Vo is connected via the cable 4a the video input terminal of the television receiver 5. In relation to the second VDP 130, scroll screen data is defined from the main CPU 101 via the SCU 100 to the VRAM 131 and colour RAM 130b. Data controlling image display is also defined to the second VDP 130 in the same manner. Data defined to the VRAM 131 is read by the second VDP 130 in accordance with details set in the register 130a, becoming image data for each scroll screen which displays the background to the characters. The priority of image data consisting of image data for each scroll screen and polygon data fed from the first VDP 120 with texture mapping implemented is determined according to the settings in the register 130a, and synthesised to give the final display screen data.

Where the display image is of the palette type, the colour data defined in the colour RAM 130b by the second VDP 130 in accordance with its values is read in order to generate colour data. Where the display image data is of the RGB type, it is adopted as the display colour data without any modification. The display colour data is stored in the memory 132, and then output to the encoder 160. The encoder 160 generates projection image data by adding a synchronisation signal to this image data, and supplies it to the video input terminal of the television receiver 5 via the video output terminal Vo. In this manner the game screen is displayed on the screen of the television receiver 5.

The sound block 12 has a DSP 142 which synthesises the sound according to the PCM system or FM system, and a CPU 141 which controls the DSP 142. Sound data generated by the DSP 142, is converted into dual-channel sound signals in a D/A converter 170, and fed via an interface 171 to an audio output terminal Ao.

This audio output terminal Ao is connected via the cable 4b to the audio input terminal of the television receiver 5. Thus, sound signals are input via the audio output terminal Ao and cable 4b through the audio input terminal of the television receiver 5 to an audio amplification circuit (not shown in the drawing). After amplification in the audio amplification circuit, the sound signals drive the speakers 5a, 5b which are housed within the television receiver 5.

The sub-system 13 comprises a CD-ROM drive 1b, a CD-I/F 180, a CPU 181, an MPEG audio unit 182, and MPEG video unit 183 and other components. It has the function of reading application software which is supplied in CD-ROM aspect, and reproducing moving images. The CD-ROM drive 1b serves to read data from CD-ROMs. The CPU 181 controls the CD-ROM drive 1b, and corrects errors in the data which has been read. Data read from the CD-ROM is fed via the CD-I/F 180, bus 106 and SCU 100 to the main CPU 101 to be used as application software.

The MPEG audio unit 182 and MPEG video unit 183 are devices for restoring data which has been compressed according to MPEG (Motion Picture Expert Group) standards. By using them to restore MPEG compressed data which has been read into the CD-ROM, it is possible to reproduce moving images.

Action of the Game Machine

The main CPU 101 performs type selection screen and game play actions in accordance with the application software fed from the cartridge or CD-ROM in the form of the medium which has been set in the cartridge I/F 1a or CD-ROM drive 1b.

Figure 5:
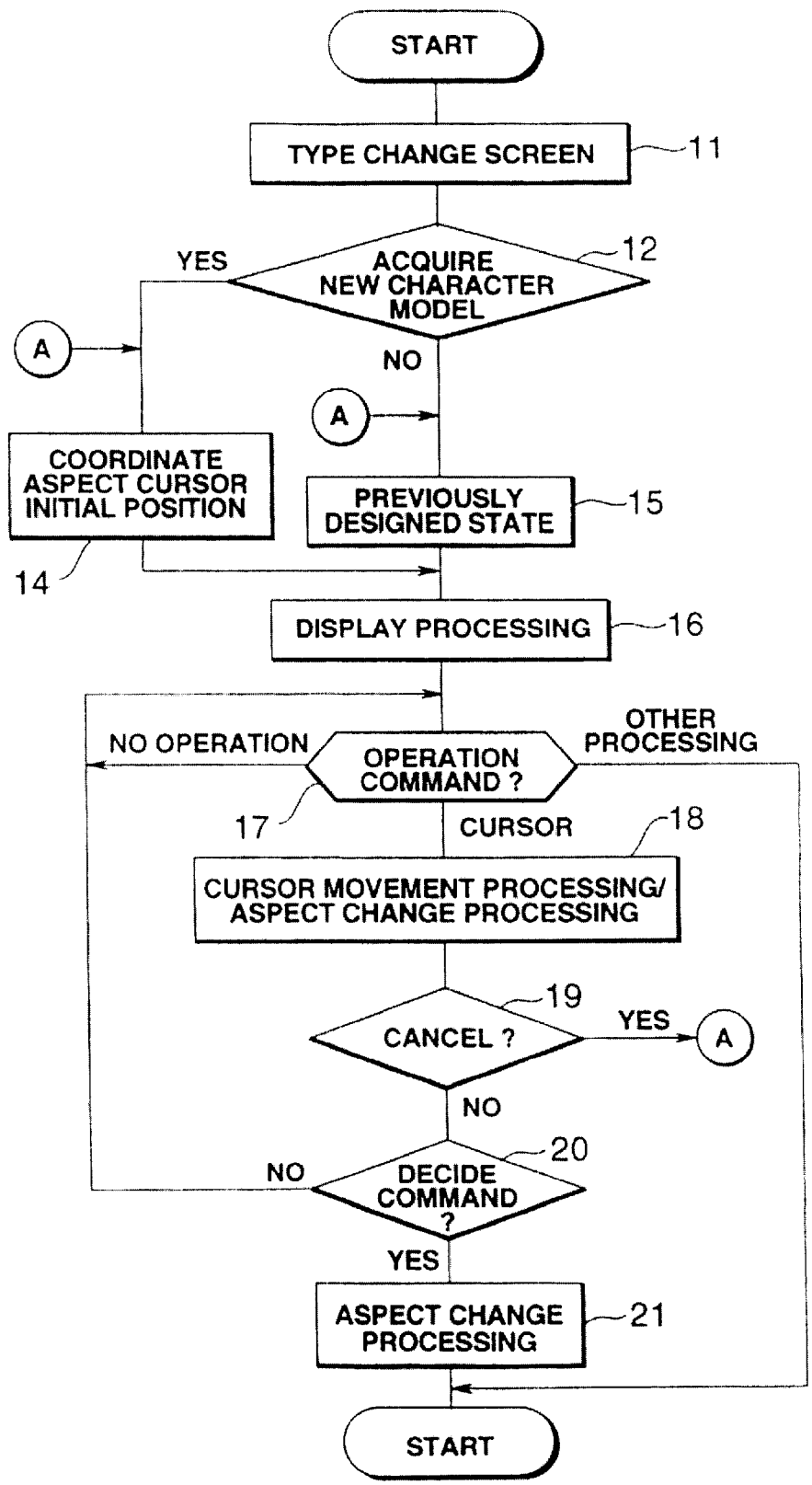
FIG. 5 is a flowchart, the purpose of which is to explain in outline the actions involved in designing character aspects on the game machine.

FIG. 5 is a flowchart, the purpose of which is to explain in outline the actions involved in designing character aspects on the game machine. The flowchart shown in FIG. 5 is implemented by the main CPU 101 when the player operates the pad or other device for activating the game machine and selects the type selection screen.

When the type selection screen selection command is input, the main CPU 101 implements the flowchart shown in FIG. 5. First of all, the type change screen is displayed (in order to draw attention to the transformations which may be made to the character aspect) (Step (S)11).

Next, it progresses to an assessment of whether a new character model has been acquired (S12). Acquiring a new character model is like the player being given a new dragon which differs from the previous one when the game proceeds to the next stage.

If a new character model has been acquired (S12: YES), this character model becomes the standard model, and the dragon is set in its standard aspect by setting data that and its cursor initial position (S14). Display processing is implemented (S16), and an initial screen 300a like the one illustrated in FIG. 2(a) is displayed. If no new character model has been acquired (S12: NO); the previously set data is adopted, aspect setting and display processing being implemented (S16). As a result, the previous aspect (not shown in the drawing) is displayed.

Next, continuous monitoring is implemented to check if the pad or other device for operating the game machine has been operated, or if any operational command has been given to move the cursor (S17). If no operational command has been given to move the cursor (S17: NO OPERATION), the operational command enters stand-by mode. If the pad or other device for operating the game machine has been operated but it was not a command to move the cursor (S17: OTHER PROCESSING), this flowchart ceases to apply, and it switches to the processing to which the command applied.

If an operational command has been given, and it was a command to move the cursor (S17: CURSOR), processing to move the cursor 250 and transform the aspect of the character 200A is implemented (Sl8). When this processing is finished, an assessment is made as to whether the cancel button has been depressed (S19). If it has been depressed (S19: YES), the program returns to Step 15.

If the cancel button has not been depressed (S19: NO). an assessment is made as to whether the pad or other device for operating the game machine has been operated to input a command to decide the aspect (S20). If it has not (S20: NO) the program returns to Step 17. If it has (S20: YES), aspect change processing is implemented (S21), the program exits from the processing illustrated in FIG. 5, and moves to the player menu screen. It is also possible to alter the flowchart so that Step 19 is omitted and the action of cancelling not permitted.

Figure 6:
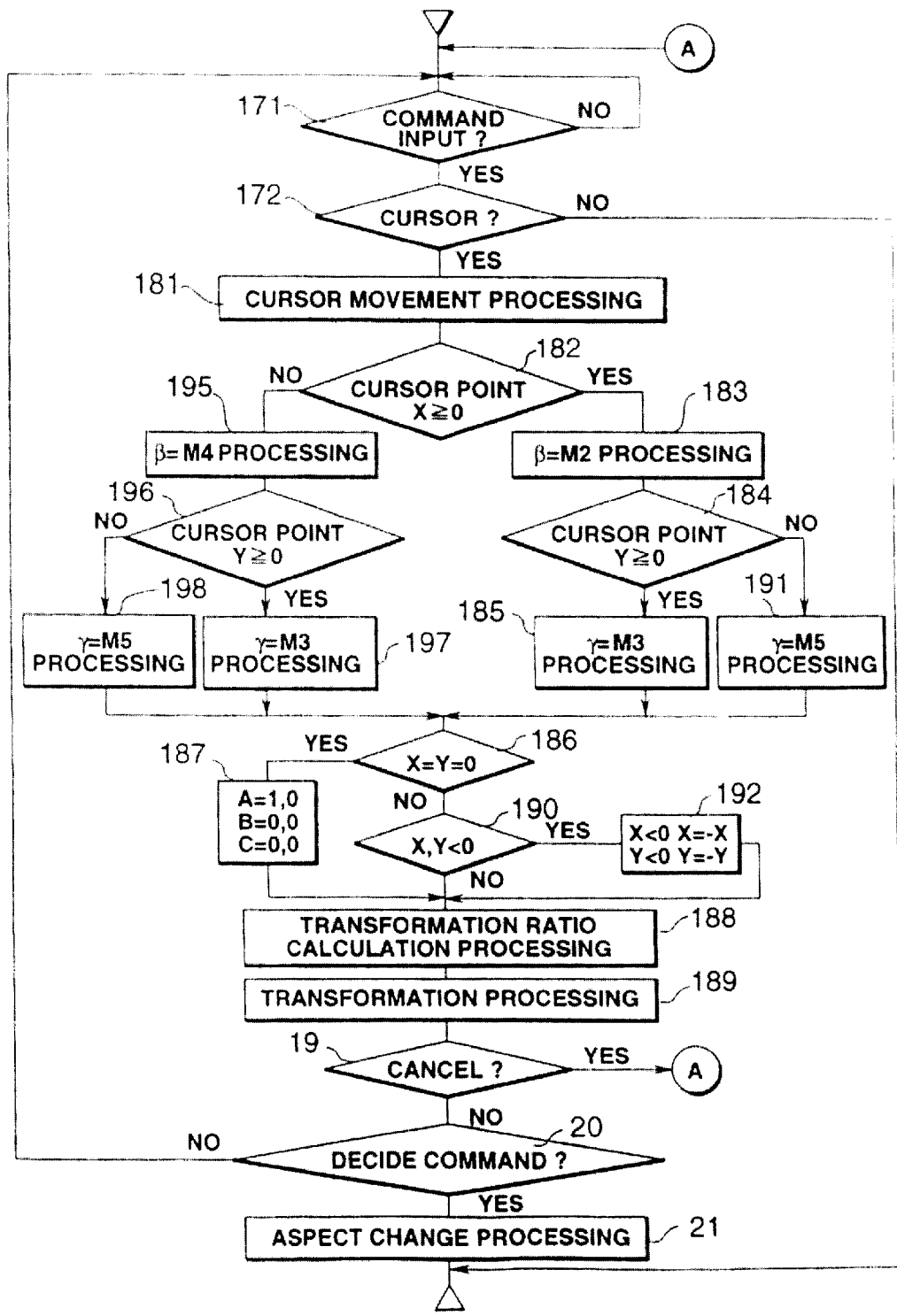
FIG. 6 is a flowchart explaining the actions of the first embodiment of the same.
Figure 7:
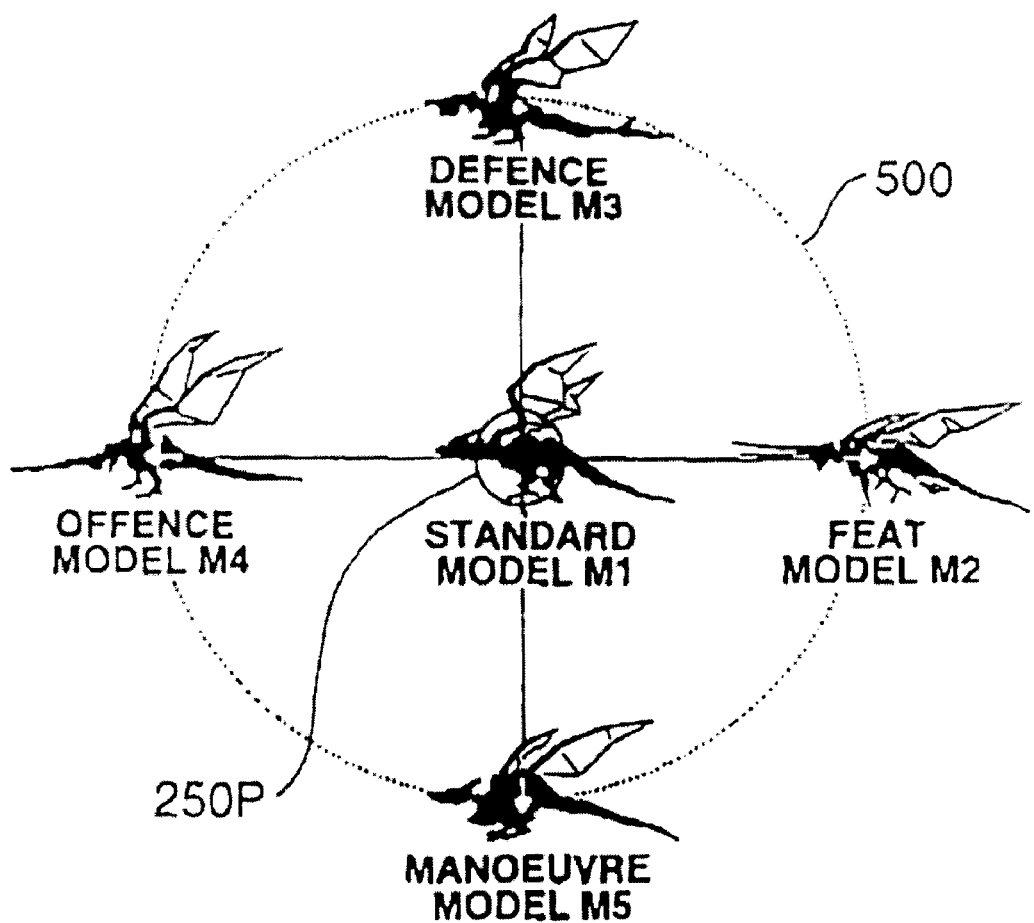
FIG. 7 is an explanatory diagram illustrating the type selection graph which is required for designing character aspects in the first embodiment of the same.

There follows a detailed description of the action of designing character aspects with reference to FIGS. 6–9. FIG. 6 is a flowchart explaining in detail the action of defining character aspects. FIG. 7 is an explanatory diagram illustrating the type selection graph which is required for designing character aspects. FIG. 8 is a diagram, the purpose of which is to explain changes in the coordinates of the coordinate display point cursor in the type selection graph. FIG. 9 is an explanatory diagram which shows characters 250 and other elements displayed on the screen of the television receiver 5.

The type selection graphs in FIGS. 7 and 8 will be explained before the flowchart in FIG. 6. In FIGS. 7 and 8 the intersecting coordinates X, Y have been taken and surrounded with a circle 500. A standard model M1 is located on the point of intersection of the axes X, Y of the intersecting coordinates X, Y, a feat model M2 (e.g., a model which has properties of employing a large number of feats, or is particularly expert in a feat) is located at the point of maximum value on the X>0 side of the X axis, a defence model M3 (a model with excellent defence capabilities) is located at the point of maximum value on the Y>0 side of the Y axis, an offence model M4 (a model with excellent offence capabilities) is located at the point of negative maximum value on the X<0 side of the X axis, and a manoeuvre model M5 (a model with excellent manoeuvrability) is located at the point of negative maximum value on the Y<0 side of the Y axis.

In FIGS. 7 and 8, the cursor point 250P is located in the initial screen on the point of intersection between the X and Y axes. There follows a detailed description of the action of designing character aspects. FIG. 6 serves to explain in detail the action of Step 18 of FIG. 5. The action of Step 17 and thereafter will be described, while that of Steps 11–16 will be omitted. Steps which are the same as those of FIG. 5 are allocated the same codes. First of all, the type selection screen selection command is input, Steps 11–16 of FIG. 5 are implemented, and the program progresses to Step 17.

Step 17 consists of two processes. Firstly, monitoring is implemented continuously to check whether the pad or other device for operating the game machine has been operated (S171). If no operational command has been input (S171: NO), the program returns to monitoring to check whether an operational command has been input or not (S171).

If an operational command has been input (S171: YES), the program judges whether it was an operational command to move the cursor (S172). If it was a different operational command (S172: NO), the program exits from the flowchart and moves to process the relevant operational command. If it was a command to move the cursor (S172: YES), the processing to move the cursor is implemented (S181), and the program progresses to the action of designing the character aspect.

To explain the action of designing the character aspect, first of all, three models α, β, γ which are actually to be used are selected by the position of the cursor (positive or negative: transformational elements). Next, the ratios A, B, C whereby the three models α, β, γ are to be transformed according to the position of the cursor are calculated, and the desired character 200A obtained by transforming the three models α, β, γ in accordance with these ratios A, B, C, then mixing them. In other words, a plurality of characters corresponding to distinctive properties are prepared in advance, and morphing (i.e., alteration of aspects) is implemented for such plurality of characters in accordance with the ratio of properties set by the player. Upon morphing, the parameter of a character is directly reflected to the displayed aspect of the character, and therefore, by observing the character, the player can immediately guess the property of the character.

Especially, in cases where a plurality of players are playing a game with characters constructed by themselves, the players are able to decide their strategy of proceeding the game by observing and confirming the characters held by their competitors, whereby the game becomes more interesting. Moreover, if the same rule (property-correspondency) is applied to the enemy character, it is possible to decide a strategy after confirming the shape of the enemy character etc., and the game will be more interesting.

By virtue of the fact that the above actions are processed in real time, the character 200A is transformed continuously in line with the continuous movement of the cursor 250.

When the program shifts to the action of designing character aspects, the CPU 101 adopts model α=model 1, progressing to the action of selecting the models b, γ by the next flowchart. Firstly it judges whether the cursor point 250P of the cursor 250 is at X24 0 on the X axis.

Action Where the Cursor Point is at X=0, Y=0 on the X Axis

If the cursor point 250P (cf. FIG. 7) is at X≧0 on the X axis (S182: YES), first of all, model M2 is adopted as models (S183), and the program judges whether the cursor point is at Y≧0 on the Y axis (S184). If the cursor point is at Y≧0 on the Y axis (cf. FIG. 7; S184: YES), model M3 is adopted as model γ.

Next, the main CPU 101 judges whether the cursor point 250P is at X=Y=0 (S186). Since on the initial screen the cursor point 250P is at X=Y=0 (S186: YES), it adopts A=1, B=0, C=0 (S187), and implements processing to calculate the ratio of change (S188). Using the result of this calculation of the ratio of change, processing is implemented to transform model α by ratio A (=1). model β by ratio B (=0), and model γ by ratio C (=0), and to mix them (S189). Consequently, the initial screen 300a (FIG. 2(a)) is displayed.

The program then judges whether the cancel command has been input (S19). In this case it had not been input (S19: NO), so the program judges whether the aspect decide command has been input (S20). In this case it has not (S20: NO), and therefore the program returns to Step 171.

Figure 8A:
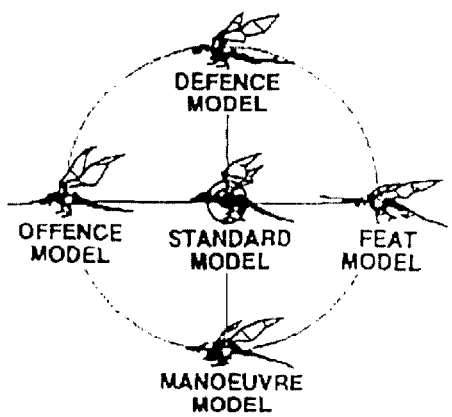
FIG. 8 is a diagram, the purpose of which is to explain changes in the coordinates of the coordinate display point cursor in the type selection graph in the first embodiment of the same.

Action Where the Cursor Point is at X>0, Y>0 on the X Axis (cf. FIG. 8(a))

If the cursor point 250P (cf. FIG. 7) is at X>0 on the X axis (S182: YES), first of all, model M2 is adopted as model β (S183), and the program judges whether the cursor point is at Y>0 on the Y axis (S184). If the cursor point is at Y>0 on the Y axis (cf. FIG. 7; S184: YES), model M3 is adopted as model γ.

Next, the main CPU 101 judges whether the cursor point 250P is at X=Y=0 (S186). In this case the cursor point 250P is at X>Y>0 (S186: NO), it judges whether the cursor point 250P is at X<0 or Y<0 (S190). In this case it is at X>0 or Y>0 (S190: NO), as a result of which calculation of the ratio of change is implemented (S188).

Figure 9B:
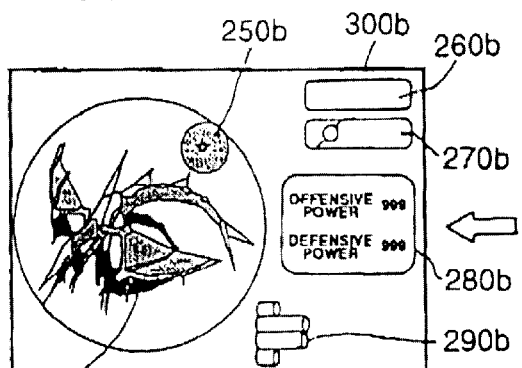
FIG. 9 is an explanatory diagram which shows characters and other elements displayed on the screen of the television receiver 5 in the first embodiment of the same.
Figure 9A:
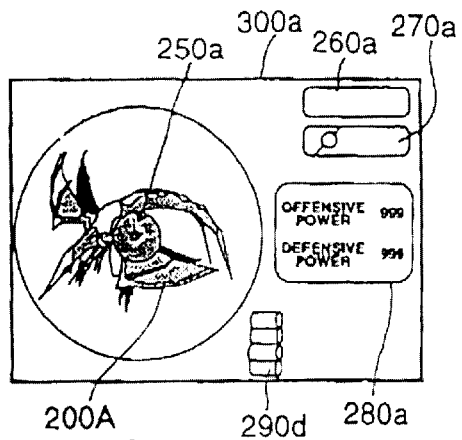

Next, the ratios of change A, B, C obtained in the above calculation are used to calculate the next ratio of change (S189) In other words, processing is implemented to transform model α by ratio A (=1), model β by ratio B (=0), and model γ by ratio C (=0) and to mix them (S189). Consequently, the initial screen 300b shown in FIG. 2(b) and FIG. 9(b) is displayed.

The program then judges whether the cancel command has been input (S19). In this case it had not been input (S19: NO), so the program judges whether the aspect decide command has been input (S20). In this case it has not (S20: NO), and therefore the program returns to Step 171.

Figure 9C:
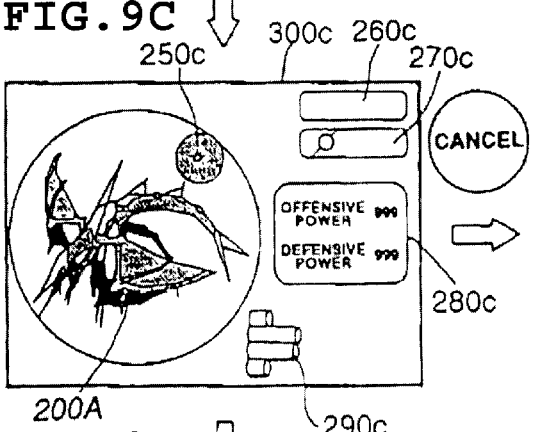
Figure 9D:
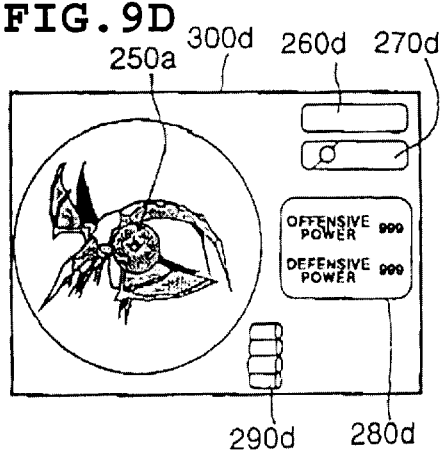
Figure 9E:
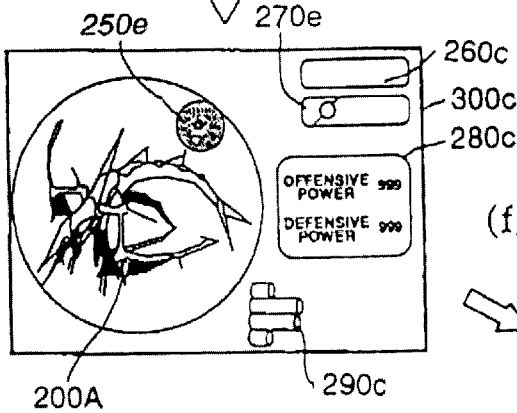
Figure 9F:
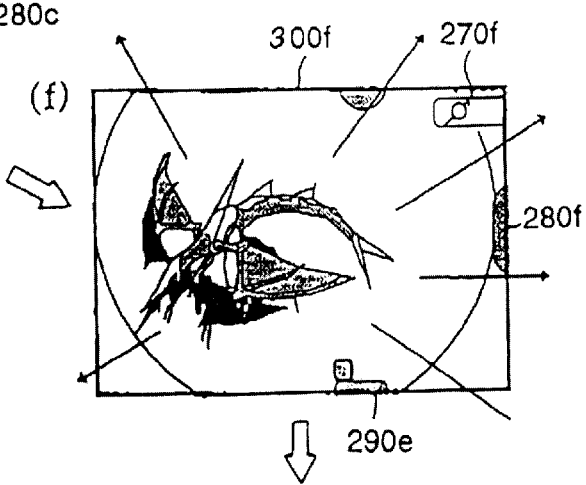

It should be added that if the command to move the cursor ceases to be input, the screen halts at the position of the cursor point 250P for which the last command was input (cf. FIG. 9(c)). If a cancel command (S19: YES) is input when the screen is like this, the program returns to initial screen display processing step S 14 or S 15 (cf. FIG. 5), and either the standard screen 300d (cf. FIG. 9(d)) or the previously set screen is displayed.

Figure 8B:
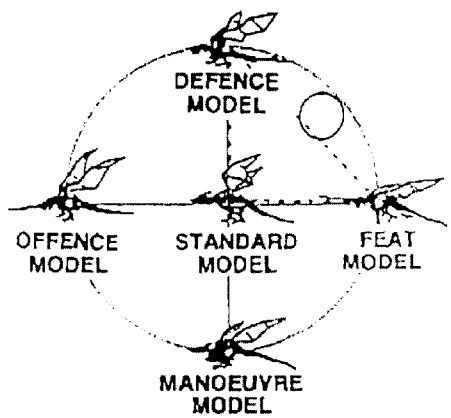
Figure 8C:
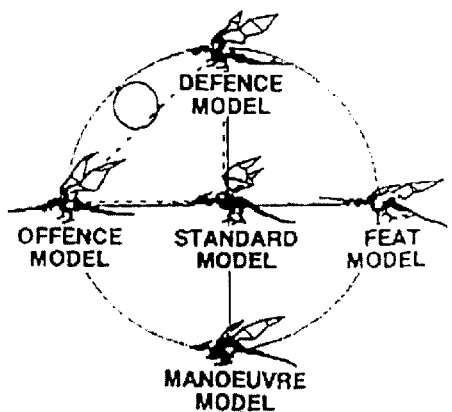
Figure 8D:
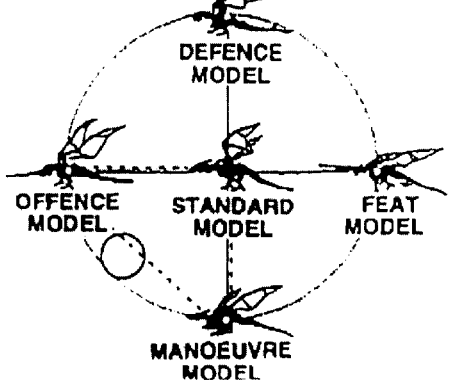

Action Where the Cursor Point is at X>0, Y<0 on the X Axis (cf. FIG. 8(b))

If the cursor point 250P (cf. FIG. 8(b)) is at X>0 on the X axis (S182: YES), first of all, model M2 is adopted as model β (S183), and the program judges whether the cursor point is at Y≧0 on the Y axis (S184). If the cursor point is at Y<0 on the Y axis (S184: NO), model M5 is adopted as model γ (Step 191).

Next, Steps 186, 190 are processed. In this case the cursor point 250P is at X>0 but Y<0 (S190: YES), as a result of which Y=−Y (S192), and the program proceeds to Step 188.

Steps 188, 189, 19, 20 are then implemented. The Steps 188 and 189 above constitute means of changing a character display, and the cursor point constitutes means of character property definition.

Action Where the Cursor Point is at X<0, Y>0 on the X Axis (cf. FIG. 8(*c*))

If the cursor point 250P (cf. FIG. 8(*c*)) is at X<0 on the X axis (S182: NO), first of all, model M4 is adopted as model β (S195), and the program judges whether the cursor point is at Y≧0 on the Y axis (S196). If the cursor point is at Y>0 on the Y axis (S196: YES), model M3 is adopted as model γ (Step S197).

Next, Steps 186, 190 are processed. In this case the cursor point 250P is at X<0, Y>0 (S190: YES), as a result of which X=−X (S192), and the program proceeds to Step 188. Steps 188, 189, 19, 20 are then implemented.

Action Where the Cursor Point is at X<0, Y<0 on the X axis (cf. FIG. 8(*d*))

If the cursor point 250P (cf. FIG. 8(*d*)) is at X<0 on the X axis (S182: NO), first of all, model M4 is adopted as model β (S195), and the program judges whether the cursor point is at Y≧0 on the Y axis (S196). If the cursor point is at Y<0 on the Y axis (S196: NO), model M5 is adopted as model γ (Step 198).

Next, Steps 186, 190 are processed. In this case the cursor point 250P is at X<0, Y<0 (S142: YES), as a result of which X=−X, Y=−Y (S192), and the program proceeds to Step 188. Steps 188, 189, 19, 20 are then implemented.

Action Where the Aspect Decide Command Has Been Input

When the character 200A displayed on the screen 300 is the one which the player desires (cf. FIG. 9(*e*)), the player depresses the decide button. As a result, the aspect decide command is input (S20: YES), and the program proceeds to process the change of aspect (S21). As a result of this processing, the character 200A as seen in screen 300*a* may, for example, flash momentarily and then disappear from the screen while all the parts which constituted the screen break up and are fragmented, or it may move violently and increase in size to be displayed in the centre of the screen 300*f* (cf. FIG. 9(*f*)). It is then displayed in the normal display status, and the program progresses to the player menu screen.

Advantages of Embodiment 1

In order to allow a large number of characters to appear in a game, it has conventionally been necessary to construct each character in advance. The first embodiment serves to reduce the number of steps involved in the creation of characters because all that is necessary is to create a plurality of aspects.

Moreover, by operating the process himself the player is able to select and generate characters visually, sensorially and simply, thus allowing him to acquire continuously in real time an infinite number of characters according to his own likes.

Furthermore, the aspects of player characters generated continuously in real time correspond to their status (capacity parameter values, properties), so that it is possible for the player to select the desired capacity parameter value from the selected aspect.

What is more, the above embodiment permits a greater range and finer gradation of aspect changes because it is possible to set the maximum values at will, allowing them to be changed and increased.

In the graphs denoted by the codes 290*a-e* in FIGS. 2 and 9, the length of the graph has been made to correspond with the capacity of the dragon in the program. Since changes of aspect correspond to capacity parameters and status, the length of these graphs increases and decreases continuously also with the movement of the cursor.

With reference to FIG. 9, it will be seen that the length of the capacity graph increases and decreases as the cursor moves from one place to another. Consequently, it should be understood that the present invention serves not only to design and alter the aspect of characters continuously, but also continuously to design and alter their properties and capabilities.

Figure 10:
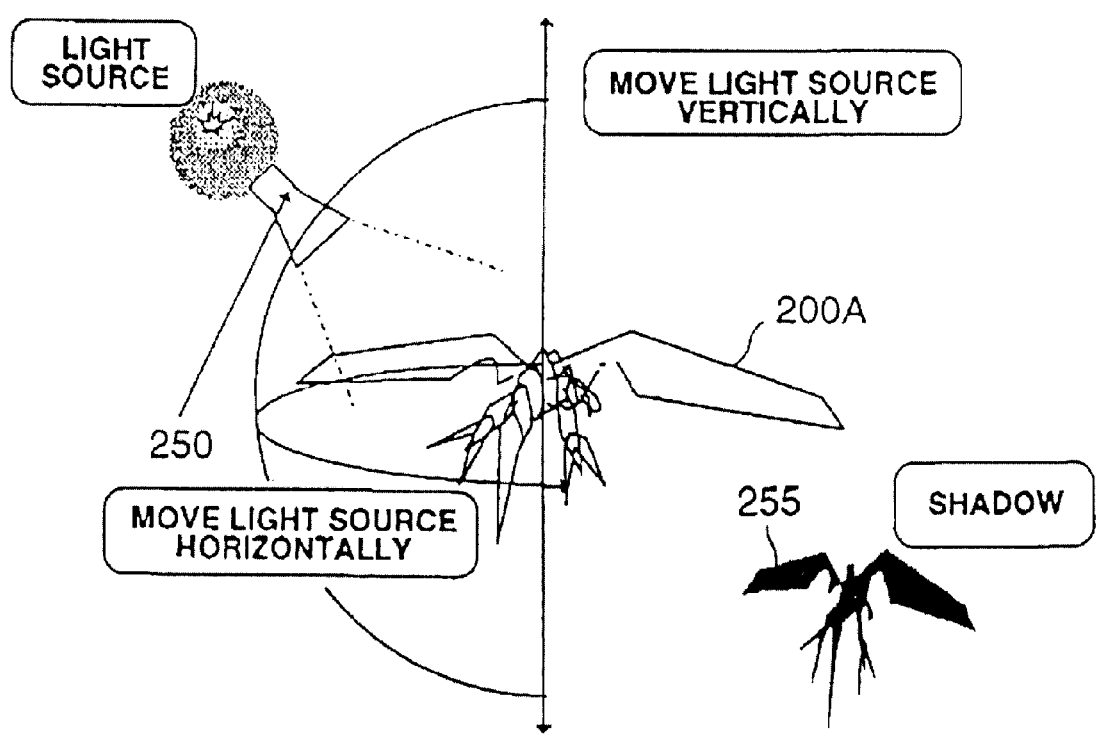
FIG. 10 is a diagram which illustrates the relationship between the light source and the shadows of the characters.

The first embodiment has been described in terms of a system of intersecting coordinates X, Y, but it may also consist of an X axis or Y axis only. Moreover, as is shown in FIG. 10, the cursor 250 is displayed as a light source. Consequently, according to the position of the cursor the shadow 255 of the character 200A is displayed in a position which is in point symmetry with it on the screen 300 through the point of intersection between the X and Y axes.

For instance, as may be seen from FIG. 10, if the cursor 250 is in the area where X<0, Y>0, the centre of the character 200A is located on the point of intersection between the axes X, Y, and its shadow 255 is displayed in a position which is in point symmetry with the cursor through the point of intersection between the axes X, Y, being here the area where X>0, Y<0.

There is no need for the axes X, Y to be displayed on the type selection screen, and it is possible to represent the directionality of the status satisfactorily in a visual fashion simply by changes in the light source and in the shape and colour of the character.

It is also possible for the movement effect of the cursor as a result of the light source to be not a shadow, but directed on the body 200A as such, thus allowing it to be felt visually in three dimensions and increasing the degree of interest.

During processing of character type selection, it is also possible to prepare a standard aspect of the character and maximum-value models at various stages, so as to provide more variations as the character grows.

The above embodiment has described how the player character may be altered and designed, but the same method may also be applied to the enemy character. Moreover, the characters can be altered and designed by determining not only positional data of the cursor, but also player points, enemy character points, progress of the game, remaining lifespan of the characters and other game conditions (status).

Furthermore, it is also possible to prohibit changes in character aspect (status) while the player character is busy (eg during processing of a fight between the player and enemy characters). In other words, by making it possible to implement aspect design at times other than this, it becomes feasible to design the aspect and properties of the character as occasion arises in preparation for battle, allowing the player to envisage or expect the engagement in battle which he desires. This serves to improve strategy in the battle scenes, which are important in terms of the game machine.

Conversely, it is possible to allow changes in the aspect of the dragon during combat. This allows the properties and aspect of the dragon to be changed when he is in a perilous situation in the game program in order to give him greater defensive power. Moreover, in this embodiment the aspect and properties of the dragon are linked.

For instance, a dragon with a high degree of defensive power has a peculiar aspect to match this, so that the player can predict the properties of the dragon at a glance.

Moreover, in designating the coordinates by moving the cursor in the above embodiment it is possible, where they have been designated in such a manner that the values in one direction are maximum and the other values are minimum, for the value 0+a to be allocated to the minimum values, thus making calculation easier and producing the effect, for instance, of avoiding the unnatural situation where a character is able to attack during combat although its offensive power is 0.

Furthermore, in addition to the cartridge ROMs and CD-ROMs already mentioned, it is possible to make use of a communications medium on the Internet or on a modem transmission network as the medium on which the activating program for the game machine is recorded.

Figure 11:
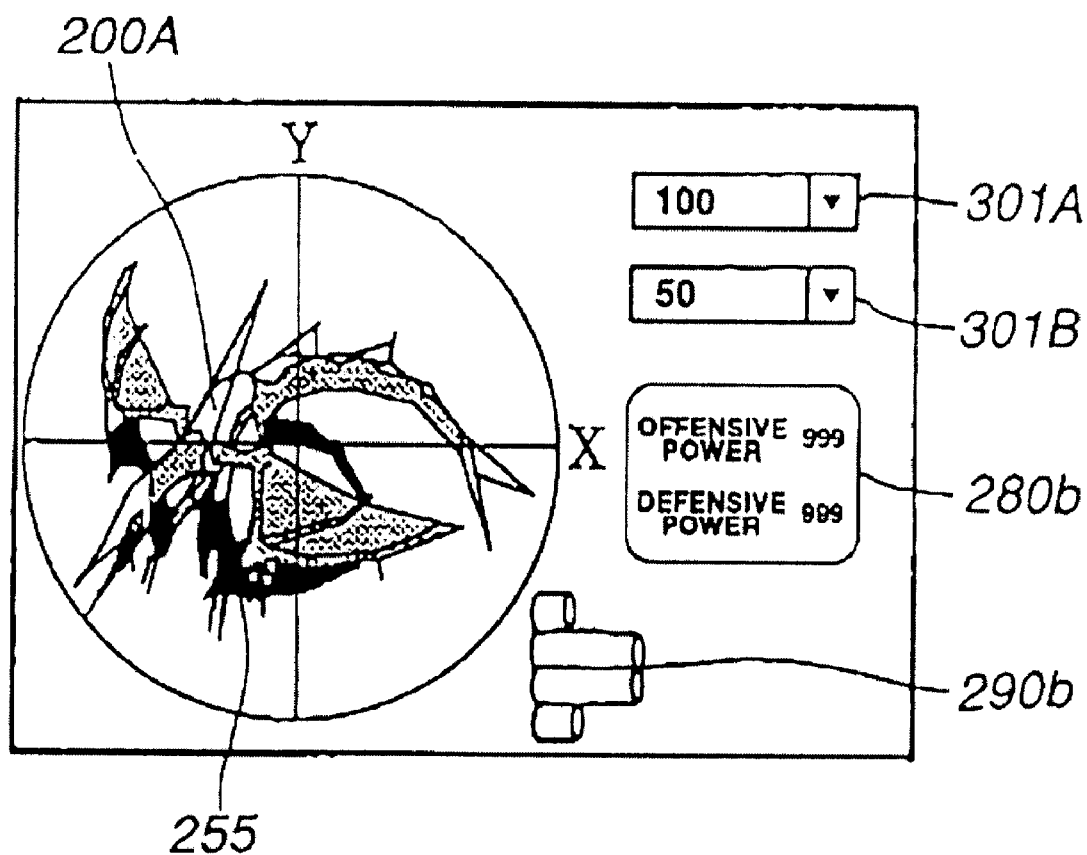
FIG. 11 is an explanatory view related to other examples for changing the properties and aspects of the character.

Furthermore, although in the above-described embodiment alteration and control etc. of the properties and aspects of the character are implemented by the movement of the cursor point, there may be provided fields 301A and 302B allowing direct input of character property value, so that upon input of a certain property value in such field, the aspect of the character will be altered in stages with the increase, decrease or change in the property value, as shown in FIG. 11. In FIG. 11, code 301A is a field for inputting an offensive force, and the player will increase or decrease the value of the offensive force using a peripheral device at hand. An increase of value applies to an increase of the offensive force, while a decrease of value applies to a decrease of the offensive force. Field 301B is a field for inputting a defensive force, which is the value remaining after deducting the value of the offensive force from the standard value. The larger the value of field 301B, the stronger will be the defensive force. The sum of the offensive force and the defensive force will be set at a prescribed value, and the increase in the offensive force will result in the decrease of the defensive force. Thus, the properties of the character in the game will be reflected continuously on the displayed aspect of the character.

Although explanation is made so far in the present embodiment concerning a method for transforming the character aspect and visually expressing the character properties, the colouration may be changed in stages or the colour combination of the texture mapped on the polygon may be changed continuously. For example, the colour combination of the texture and the reflection of the light source may be changed continuously in line with the increase of the defensive force so that there will be an impression of increased rigidity in the virtual material of the character. Otherwise, a method of changing the brilliance or transparency may be utilized.

Furthermore, if visual differences of the character are to be expressed by an enlargement or reduction of the character in axial directions, or by a change in the colour, brilliance or transparency of the character, the expression of the character may be changed, needless to say, without preparing a plurality of patterns but by changing the properties of the character. That is, the colour data etc. can be programmably produced by utilizing a display data producing function having property data as its argument. Even if the property data is changed in the same manner, an optional use of the display data producing function brings about increased variations of visual alterations. In other words, it is possible to create a character having an incidental property of an easily-changed aspect corresponding to the change in the properties, as well as a character having an incidental property of uneasily-changed aspect.

EFFECT OF THE INVENTION

The image processing device to which the present invention pertains produces the following effects.

(1) It permits play with free character aspects because they are transformed in line with the movement of the cursor.

(2) It permits selection of the desired character aspect because they change continuously.

The character aspect design device to which the present invention pertains produces the following effects.

(1) It is normally necessary to prepare a plurality of player characters if they are to appear in a game, but the present invention serves to reduce the number of steps involved in the creation of characters because all that is necessary is to create a plurality of aspects.

(2) By operating the process himself the player is able to select and generate characters visually, sensorially and simply, thus allowing him to acquire continuously in real time an infinite number of characters according to his own likes.

(3) The aspects of player characters generated continuously in real time correspond to their capacity parameter values, so that it is possible for the player to select the desired capacity parameter value from the selected aspect.

What is claimed is:

1. An image processing device, comprising:
   (1) means for displaying a character in standard aspect and a cursor point on a type selection screen which is different from a game screen, wherein the standard aspect of the character is transformed and displayed in accordance with defining parameters, and wherein the cursor point is moved in accordance with movement commands for peripheral devices; and
   (2) means for continuously changing and selecting the defining parameters of said character from a predetermined range of parameters during in line movement of the cursor point, such that the aspect of said character is continuously changed in accordance with changes in positional data which the cursor point occupies as the cursor point is moved.

2. The device according to claim 1 wherein the defining parameters correspond to changes in specific properties of the character, while a direction of movement of the cursor point corresponds to a direction of change in the specific properties of the character.

3. A device for changing character aspects, comprising:
   (1) means for displaying a character in standard aspect and a cursor point on a type selection screen which is different from a game screen, wherein the aspect of the character is transformed and displayed in accordance with defining parameters, and wherein the cursor point is moved in accordance with movement commands from peripheral devices;
   (2) means for continuously processing the defining parameters of said character from a predetermined range of parameters during in line movement of the cursor point, such that the aspect of said character is continuously changed in accordance with changes in positional data which the cursor point occupies as the cursor point is moved; and
   (3) means for adopting for use in image processing an aspect transformation of said character displayed, corresponding to the defining parameters of said character to be displayed in image processing.

4. The device according to any of claims 1 or 3, further comprising means for display control whereby the various properties of the character after transformation are rendered into an image and displayed.

5. The image processing device of claim 1, wherein the defining parameters correspond to a plurality of character models.

6. The image processing device of claim 5, wherein the plurality of character models includes a standard model.

7. The image processing device of claim 6, wherein the standard model corresponds to a cursor point located at an intersection of an X and Y axis.

8. The image processing device of claim 5, wherein the plurality of character models includes a defense model.

9. The image processing device of claim 8, wherein the defense model corresponds to a cursor point located at a maximum positive value on the Y>0 side of a Y axis.

10. The image processing device of claim 5, wherein the plurality of character models includes an offense model.

11. The image processing device of claim 10, wherein the offense model corresponds to a cursor point located at a maximum negative value on the X<0 side of an X axis.

12. The image processing device of claim 5, wherein the plurality of character models includes a maneuver model.

13. The image processing device of claim 12, wherein the maneuver model corresponds to a cursor point located at a maximum negative value on the Y<0 side of a Y axis.

14. The image processing device of claim 5, wherein the plurality of character models includes a feat model.

15. The image processing device of claim 14, wherein the feat model corresponds to a cursor point located at a maximum positive value on the X>0 side of an X axis.

16. A computer-readable medium encoded with instructions for directing a processor for:

displaying a character and a cursor point on a type selection screen which is different from a game screen, wherein the character has a standard aspect;

transforming an aspect of said character in accordance with defining parameters;

moving the cursor point in accordance with movement commands from peripheral device; and changing the defining parameters of said character from a predetermined range of parameters continuously during in line movement of the cursor point, such that the aspect of said character is continuously changed in accordance with changes in positional data which the cursor point occupies as the cursor point is moved.

17. A method for processing character aspect designs, comprising:

displaying a character on a type selection screen which is different from a game screen, wherein the character has a standard aspect and properties;

designating a prescribed position on coordinates corresponding to the aspect of said character; and reflecting continuous changes in the coordinates in the character properties from a predetermined range of character properties, such that the aspect of said character is continuously changed in accordance with changes in the coordinates.

18. The method of claim 17, further comprising:

displaying an amount of change in the character properties.

19. A design processing system for changing character properties before starting an actual game scene, comprising:

a display module for displaying a character on a type selection screen which is different form the actual game scene before starting the actual game scene, wherein the character has a standard aspect and properties;

a position designating module for designating a prescribed position on coordinates corresponding to an aspect of the character; and a coordinate changing module wherein continuous changes in the coordinates are reflected in continuous changes in the character properties from a predetermined range of character properties before starting the actual game scene.

20. A design device for characters in image processing, wherein position data of a cursor displayed on a type selection screen which is different from a game screen is reflected continuously in changes in at least one of: the character aspect or the character properties from a predetermined range of character aspects or character properties, such that the character aspect or character properties is continuously changed in accordance with changes in positional data which the cursor occupies as the cursor is moved.

21. A game machine, comprising:

means for displaying a character on a type selection screen which is different from a game screen in accordance with operation signals from a player;

means for defining properties of said character from a predetermined range of properties; and means for continuously altering character aspects, wherein an aspect of said character is altered in accordance with said means for defining properties, such that the character aspects are continuously altered in accordance with positional data provided by the means for defining properties of the character.

22. A game machine, comprising:

means for displaying a character on a type selection screen which is different from a game screen in accordance with operational signals from a player;

means for continuously altering character aspect in line with operational signals from a player, such that the character aspect is continuously altered in accordance with changes in the operational signals from the player; and means for defining character properties from a predetermined range of character properties in accordance with the displayed aspect of said character.

23. A game machine, comprising:

means for displaying a character pursuant to operational signals from a player on a type selection screen which is different from an actual game scene before starting the actual game scene, wherein the character has a plurality of standard displayed aspects corresponding to a plurality of preset properties; and means for defining character properties from a predetermined continuous range of character properties in accordance with operational signal from the player before starting the actual game scene, wherein said plurality of standard displayed aspects are mixed and displayed based on the ratio of the plurality of properties defined by the means for defining character properties.

24. An image processing device for setting parameters for defining characters, comprising:

(1) a display control for displaying a character in standard aspect and a cursor point are displayed on a type selection screen which is different from a game screen, wherein an aspect of said character is transformed and displayed in accordance with parameters from a predetermined range of parameters defining the aspect of said character, and wherein the cursor point is moved in accordance with movement commands from peripheral devices; and (2) a parameter processor wherein the parameters defining the aspect of the character are changed continuously in line with movement of the cursor point, such that the aspect of the character is continuously changed in accordance with changes in positional data which the cursor point occupies as the cursor point is moved.

25. A character aspect design device where character aspects are changed by setting parameters defining the character aspects, comprising:

(1) a display control for displaying a character in standard aspect and a cursor point on a type selection screen which is different from a game screen, wherein an aspect of said character is transformed and displayed in accordance with parameters from a predetermined range of parameters for defining the aspect of said character, and wherein the cursor point is moved in accordance with movement commands for peripheral devices;

(2) a parameter processor for changing the parameters for defining the aspect of said character continuously in line with movement of the cursor point, such that the aspect of said character is continuously changed in accordance with changes in positional data which the cursor point occupies as the cursor point is moved; and (3) a parameter adopting unit for adopting character aspects that have been changed by a designer.

26. A design processing device for changing character properties before starting an actual game scene, comprising:

a display module for displaying a character on a screen before starting the actual game scene;

a position designating modules for prescribing a position on coordinates corresponding to an aspect of the character; and a property changing module for reflecting continuous changes in the coordinates as continuous changes in properties of the character before starting the actual game scene.

27. A game machine, comprising:

a character display module for displaying a character on a type selection screen which is different from a game screen controlled pursuant to operational signals from a player;

a property definition module for defining properties of said character from a predetermined range of properties; and a character aspect alteration module for altering an aspect of said character based on property data defined by said property definition module, such that the aspect of the character is continuously changed in accordance with continuous changes in the property data.

28. A game machine, comprising:

a character display module for displaying a character on a type selection screen which is different from a game screen controlled pursuant to operational signals from a player;

a character aspect alteration module for altering an aspect of said character continuously in line with operational signals from a player, such that the character aspect is continuously altered in accordance with changes in the operational signals from the player; and a property definition for defining properties of said character from a predetermined range of properties in accordance with said aspect of said character.

29. A game machine, comprising:

a character display unit wherein a character controlled by operational signals from a player is displayed on a game screen which is different from an actual game screen before starting the actual game scene, and wherein the character has a plurality of standard displayed aspects corresponding to a plurality of present character properties; and a property definition unit wherein said plurality of present character properties from a predetermined continuous range of character properties are defined based on said operational signals from the player before starting the actual game scene, wherein said plurality of standard displayed aspects are mixed and displayed based on a ratio of said plurality of present character properties defined by said property definition unit.

* * * * *